United States Patent Office 2,860,362
Patented Nov. 18, 1958

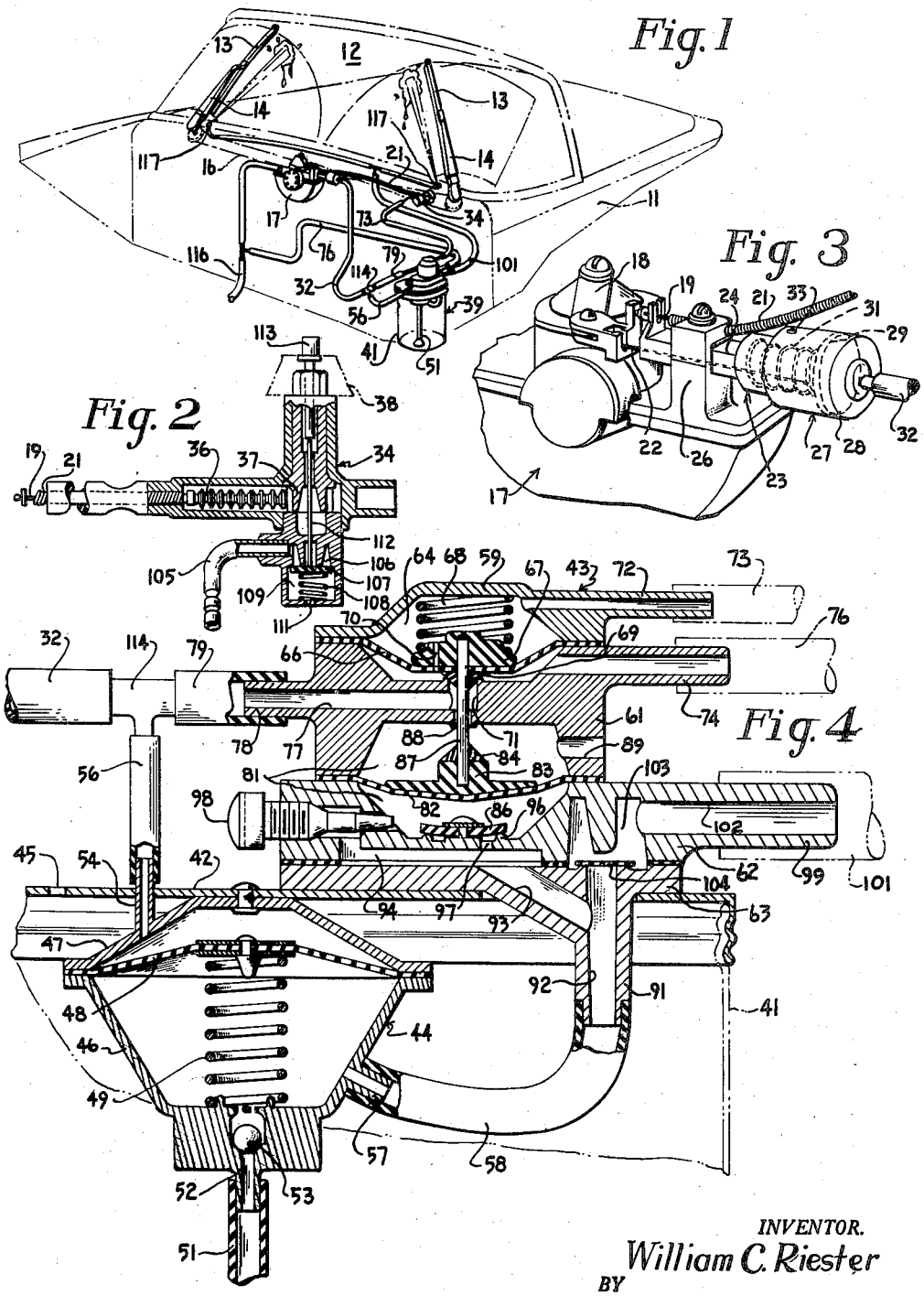

2,860,362
WINDSHIELD WASHER-WIPER ARRANGEMENT

William C. Riester, Buffalo, N. Y., assignor to Trico Products Corporation, Buffalo, N. Y.

Application November 28, 1956, Serial No. 624,910

10 Claims. (Cl. 15—250.4)

This invention relates to a windshield washer-wiper arrangement for use on motor vehicles, and more particularly to a vehicle windshield washer-wiper arrangement including a super-atmospheric pressure operated motor.

In the copending patent application of R. A. Deibel and W. C. Riester, Serial No. 530,970, filed August 9, 1955, a washer-wiper arrangement is disclosed whereby a complete windshield cleaning cycle is initiated by simply depressing a control button. In the aforesaid arrangement, the cleaning cycle includes a spraying of cleaning liquid upon the windshield, a turning-on of the wiper motor, a prolonged period of wiper motor operation after cessation of windshield spraying, and return of the wiper motor to the condition it was in prior to the initiation of the cleaning cycle, viz., the motor will either be parked, or will continue operating at the speed for which it was set prior to initiation of the windshield cleaning cycle.

The present invention incorporates a super-atmospheric pressure operated wiper motor forming part of an arrangement which operates to provide a complete washing and wiping cycle upon depressing a control button. In addition, the arrangement is such as to assure spraying of water upon the windshield before wiper motor operation to avoid smearing of the windshield when the latter is splashed with muddy water or other vision obscuring matter.

The main object of the invention is to provide a motor vehicle having a super-atmospheric pressure operated wiper motor with a washer-wiper arrangement that will automatically complete a cleaning cycle once the cycle has been initiated.

Another object of this invention is to provide a vehicle windshield washer and wiper arrangement in which the water is sprayed on the windshield before movement of the wiper blade thereon.

A further object of the invention is to provide a windshield washer-wiper arrangement for use on a vehicle having a super-atmospheric pressure operated wiper motor in which wiper motor operation is prolonged for a predetermined period after cessation of cleaning liquid spraying upon the vehicle windshield.

Another object of the invention is to provide a vehicle washer-wiper arrangement for use in connection with a super-atmospheric pressure operated wiper motor, in which control of motor operation is temporarily assumed by a coordinating unit, and wherein the control of the wiper motor is restored to a primary motor control after completion of the windshield cleaning cycle.

These and further objects and features of the invention will become more apparent from the following description and the accompanying drawing wherein:

Fig. 1 is a fragmentary perspective illustration of a motor vehicle having a washer-wiper arrangement representative of an embodiment of the invention;

Fig. 2 is a section view of the wiper motor control means;

Fig. 3 is a fragmentary perspective view of a wiper motor to which the system of the invention may be applied; and Fig. 4 is a section view of a coordinating unit and pump assembly representative of an embodiment of the invention.

Referring to Fig. 1, numeral 11 identifies a motor vehicle having a windshield 12, and a pair of wiper blades 13 mounted upon wiper arms 14, the latter of which are driven by flexible transmission means, such as cables 16 connected to a wiper motor 17 in the conventional manner. The wiper motor 17 is of the type operated by super-atmospheric pressure medium, such as compressed air, further details of structure thereof being set forth in the copending application of J. R. Oishei and M. Bitzer Serial No. 581,758 filed April 30, 1956. A rotary valve control arm 18 positioned atop the motor, is movable by either a wire 19 forming part of a Bowden wire assembly 21, or by a rod, or wire 22 which is arranged for movement by a coupler assembly 23. The coupler assembly 23 includes a shaft 24 arranged for reciprocal motion on an arm member 26 projecting from the top portion of the motor, and a piston assembly 27, comprising a housing 28 affixed at one end to the shaft 24, and enclosing a piston 29 to which the rod 22 is connected, and a helical spring 31 compressively arranged between the piston and an inside end of the housing 28. A hose, or conduit, 32 is attached to the end of the housing 28 for admission of pressurized medium, such as compressed air, into the housing to cause movement of the piston thereby compressing spring 31 and moving the rod 22 so that the control arm 18 will be moved for motor operation. A hole 33, arranged near the end of the housing, vents to atmosphere the volume behind the piston.

The Bowden wire assembly 21 extends to a primary control assembly 34, which is positioned in the vehicle for convenient manipulation by the vehicle operator. The end of the wire 19 connects with a rack means 36 slidably arranged in the control assembly for engagement by a pinion member 37, to which is attached a knob 38. By rotating the knob 38 in one direction, movement of the Bowden wire 19 will take place whereby the control arm 19 of the wiper motor will be moved for motor operation, and rotation of the knob in the opposite direction will result in the reverse movement of the control arm 18 to discontinue motor operation. Thus it will be seen that wiper motor operation may be effected by either rotation of control knob 38, or by movement of the piston 29 in the housing.

A reservoir assembly 39 adapted for the dual purpose of supplying cleaning liquid to the windshield and for the cooordination of wiper motor operation with liquid spray application, is arranged in a convenient position under the hood of the vehicle, as shown. The reservoir assembly includes a container, or jar, 41 for holding a supply of cleaning liquid, a cover 42, a coordinator unit 43 mounted on the top surface of the cover, and a pump assembly 44 mounted on the lower surface. An orifice 45 is arranged in the cover to vent the container to atmosphere.

The pump assembly 44 includes a pump chamber formed of a housing portion 46, a cap portion 47, a displacing means in the form of a flexible diaphragm 48 positionally maintained about its edges between said housing and cap portions, and a helical spring 49 compressively arranged between the underside of the diaphragm and the lower inner surface of the housing portion. A liquid tube 51 connected to a nipple 52 formed integral with the housing portion 46, is arranged to extend downwardly into the container 41 and terminate a short distance from the bottom thereof. A ball check valve 53, positioned in the housing portion, is arranged to permit one way flow of liquid from the tube 51 into the housing portion. A nipple 54 is located in the cap portion 47, and extends upwardly through the cover 42 for receiption of a hose, or conduit, 56 while a nipple 57 is located in the housing portion 46 for reception of a hose, or conduit, 58.

It will be seen that when the diaphragm 48 is forced downwardly into the housing portion 46 by compressed air, the spring 49 will be compressed and cleaning liquid will be forced therefrom via nipple 57 and hose 58; and when the diaphragm moves upwardly into the cap portion 47 under the influence of spring 49, the check valve 53 will be unseated and cleaning liquid under atmospheric pressure will flow into the housing portion.

Coordinator unit 43 is comprised of four portions, namely; a top portion 59, a top intermediate portion 61, a bottom intermediate portion 62, and a bottom portion 63, said portions being held together by a fastening means such as rivets (not shown). A pneumatic chamber 64 defined by cavities provided in the top portion and top intermediate portion, contains: a flexible diaphragm 66 which is secured about its edges between said portions; a spring seat, or disc, 67 arranged on the top surface of the diaphragm 66; a helical spring 68 compressively arranged between the top chamber 64 and the spring seat 67; and a conical valve 69 arranged on the bottom surface of the diaphragm 56 and adapted for seating within the end of a passageway 71 provided in the top intermediate portion 61. Extending through the diaphragm 56 and the spring seat 67, is a passageway 70, which serves to connect the volume beneath the diaphragm to the volume on top of the diaphragm. A nipple 72 formed integral with the top portion 59, is adapted for connecting the interior of the chamber 64 (on top of diaphragm 56) with a hose, or conduit, 73 while a nipple 74 formed integral with the top intermediate portion 61 is arranged for connecting the chamber 64 (on the bottom of diaphragm 56), with a hose, or conduit, 76. Passageway 71 is intersected by horizontal passageway 77 formed in the top intermediate portion 61, the other end of passageway 77 passing through nipple 78 to which is attached a hose 79. It will be seen that when the conical valve 69 is unseated, flow of compressed air from conduit 76, to conduit 79, will occur through nipple 74, chamber 64 (on the lower side of the diaphragm 56), passageways 71 and 76, and through nipple 78.

A hydraulic chamber 81, comprised of cavities formed in the top intermediate portion 61 and the bottom intermediate portion 62, contains: a flexible diaphragm 82 maintained about its edges between said portions; a shaft seat, or disc, 83 positioned on the top surface of the diaphragm; a conical valve 84 arranged on top of the shaft seat 83; and a flexible disc valve 86 located on the bottom surface of chamber 81. A shaft 87 is affixed at its lower end to the shaft seat 83, and extends upwardly through a hole 88 and the passageway 71 for connection at its upper end to the spring seat 67, to thereby maintain the seats 67 and 83 in coupled relationship. The hole 88 is of slightly larger diameter than the shaft to thus allow a certain amount of air flow from passageway 77 into the chamber 81, on top of the diaphragm 82, such air flow being cut off by the valve 84 when the diaphragm is forced upwardly a maximum amount in chamber 81. An orifice 89, vents the chamber 81, on top of diaphragm 82, to atmosphere.

The bottom portion 63 has a nipple 91 projecting downwardly through the cover 42 for reception of the hose 58, said nipple having a vertical passageway 92 and a passageway 93, intersecting passageway 92 at one end, the other end of passageway 93 opening into a recess 94 formed in the bottom intermediate portion 62. The disc valve 86 is arranged to engage, near its outer edge, a circular seat 96 formed on the bottom of the chamber 81, the inner region of said seat being connected with the recess 94 via a hole 97. It will be seen that liquid under pressure can flow from the passageway 93 into recess 94, through hole 97 to unseat the valve 86 and enter the hydraulic chamber 81 to act against the flexible diaphragm 82. A needle valve 98 arranged in the bottom of the intermediate portion 62, may be adjusted to regulate flow of liquid from the chamber 81 into the recess 94. A nipple 99, formed integral with the bottom intermediate portion 62 and adapted for reception of a hose, or conduit, 101 has a passageway 102 the inner end of which opens into a chamber 103 located above the end of vertical passageway 92. A flap valve 104, covering the opening of passageway 92, allows one way flow of liquid from passageway 92 into the chamber 103.

Hose 73, which is attached at one end to the nipple 72, is attached at the other end to a nipple 105 positioned on the control assembly 34 and opening into a chamber 106 which is arranged in axial alignment with the pinion member 37. Disc valve 107 is arranged to seat against the end of chamber 106, and to be normally maintained in seated position by helical spring 108, which is compressively arranged between the disc valve and the wall of a spring chamber 109 containing said spring. An orifice 111, formed in the end wall of the spring chamber is adapted to vent the spring chamber to atmosphere. Positioned within the control assembly, is a push rod, or wire, 112 the lower end of which abuts the disc valve 107, the upper end of which has an enlarged head providing a push-button 113, which projects outwardly from the control knob 38. By depressing the push button 113, the push rod 112 will be moved whereby the disc valve 107 will be unseated, thus venting the hose 73 to atmosphere via spring chamber 109 and orifice 111.

Hose 79 is connected to one branch of a T 114, the other branches of the T receiving the ends of hoses 56 and 32 as shown. The hose 76 leads to and connects with a hose, or conduit, 116 which is arranged for conduction of compressed air to the wiper motor 17, and to the coordinator 43. Hose 101 leads from the nipple 102 to spray nozzles 117, the latter being positioned for the spraying of cleaning liquid upon the windshield in predetermined areas.

Assume that the wiper motor 17 is not operating, and that the pump assembly 44 is charged, i. e., cleaning liquid is in the housing portion 46. When the vehicle operator depresses control button 113, disc valve 107 will be unseated thereby venting the pneumatic chamber 64, on top of the diaphragm 66, to atmosphere via nipple 72, hose 73, spring chamber 109, and orifice 111. Diaphragm 66 will be pressure unbalanced and the compressed air on the lower side thereof will force the diaphragm upwardly in the chamber 64, compressing spring 68 during such movement. When this occurs, the conical valve 69 will be unseated from the end of passageway 71, thus allowing flow of compressed air to passageway 77 and T 114, from whence it will flow into hoses 32 and 56.

The compressed air flow through hose 56 will enter the pump assembly 44, in the region above diaphragm 48, resulting in the downward movement thereof and the ejection of cleaning liquid from the housing portion into the nipple 57 and hose 58, through passageway 92, past the flap valve 104 to chamber 103, into passageway 102, and through the hose 101, to be conducted to the spray nozzles 117, for spraying upon the windshield. A certain amount of liquid flowing in passageway 92 will enter passageway 93, and chamber 94, from whence it will flow into hole 97, past disc valve 86 into the hydraulic chamber 81, to exert a pressure against the underside of the diaphragm 82. It will be noted that prior movement of the diaphragm 66 upwardly, resulted in similar upward movement of the diaphragm 82 by reason of the fact that the spring seat 67 is connected to shaft seat 83 by shaft 87, so that the conical valve 84 was brought into seated engagement with the end of hole 88. Liquid will be thus entrapped in the hydraulic chamber 81 to maintain the diaphragm 82 distorted upwardly in the chamber for a predetermined period of time, namely until the liquid can flow out of the chamber 81 via the needle valve 98.

Air flow from the T 114 will also occur through the hose 32 and enter the housing 28 of the coupler assembly 23, to cause movement of the piston 29 against the spring 31. Rod 22 will be moved whereby the control arm 18 of the motor will be rotated, and motor operation will begin. Thus it will be seen that spraying of liquid upon the windshield will occur substantially simultaneous with start of motor operation.

Assuming that the vehicle operator has released the push button 113, so that the disc valve 107 is again seated, passage of air will occur from the underside of the diaphragm 66 to the top side thereof via passageway 70. As air pressure on opposite sides of the diaphragm 66 becomes equalized, the diaphragm will be forced downwardly in the chamber 64 by the expansion of helical spring 68, which movement will terminate upon the seating of the conical valve 69 in the end of passageway 71. Downward movement of the diaphragm 66 will be restricted by the hydraulic pressure trapped in the chamber 81 and acting against diaphragm 82, such restriction gradually diminishing as liquid is bled out of chamber 81 via needle valve 98. Movement of the conical valve 84 downwardly results in the uncovering of the end of hole 88 thus allowing the venting of hoses 56 and 79 to atmosphere via orifice 89. Such venting of hose 56 results in the upward movement of the diaphragm 48 in the pump assembly 44, due to expansion of helical spring 49, resulting in liquid recharging of the pump assembly. The hose 32, being connected to the T 114, is likewise vented to atmosphere via passageway 71, hole 88, and orifice 89, such venting causing evacuation of compressed air in the coupler assembly 23 and allowing return movement of the piston 29 under the influence of helical spring 31. As a result of such piston movement, the rod 22 will be shifted to cause reverse rotary movement of the control arm 18 to shut off wiper motor operation.

It is to be noted that the arrangement of the control assembly is such as to provide continuation of wiper motor operation after cessation of liquid spraying, such action being due to the fact that conical valve 69 must seat before motor operation ceases. Seating of said conical valve will be delayed until liquid has drained out of the hydraulic chamber 81, which liquid drainage cannot occur until after the flow of liquid from the pump assembly 44 has stopped.

It will be realized from an understanding of the foregoing description that a windshield washer-wiper cycle of predetermined duration will take place upon initiation of said cycle by depression of the control button 113. The predetermined time will be primarily regulated by adjustment of the needle valve 98, since the flow of liquid out of chamber 81 controls the reseating time of the conical valve 69. It will, of course, be appreciated that secondary factors contribute to the establishment of such predetermined time of operation, such as for example, the diameters of passageway 70 and hole 88, and the strength of springs 68 and 49; however, once the magnitude of the secondary factors is established, regulation of the needle valve 98 is all that is required to vary the cycle time in any given arrangement.

With regard to the situation wherein the wiper motor is operating at a set speed prior to initiation of the washer-wiping cycle, it will be seen that depression of the control button 113 by the vehicle operator, will cause the coordinating unit to operate according to the manner as above described. Actuation of the coupler assembly 23, i. e., movement of the piston 29 by reason of compressed air being admitted to the housing 28, will result in movement of the rod 22 to rotate the control arm 18 of the wiper motor for fast operation thereof. It may be mentioned that the stroke of the piston 29 is adjusted to provide maximum rotary movement of the control arm 18, resulting in maximum wiper motor speed. Hence, if the wiper motor has been operating under the control of the control assembly 34, at some speed less than maximum speed, operation of the coupler assembly 23 would immediately result in maximum speed operation of the motor. Upon completion of the washer-wiping cycle, i. e., when the piston 29 had returned to original, or nonoperative position, motor control will be automatically returned to the control assembly 34, and speed of motor operation would continue at the prior setting of control knob 38.

From the foregoing description, it will be seen that means have been provided for applying a washer-wiping arrangement to a vehicle having a super-atmospheric pressure operated motor, such arrangement providing a completely automatic washer-wiping cycle, in which the wiper motor will be returned to the condition it was in prior to the initiation of said washer-wiper cycle.

The foregoing description has been given in detail without thought of limitation since the inventive principles involved are capable of assuming other physical embodiments without departing from the spirit of the invention and the scope of the appended claims.

What is claimed is:

1. An all-pneumatic windshield cleaning system comprising a cleaner unit including a wiper, a motor to drive the same, and a control for the motor operable for connecting the same to a source of fluid pressure; a washer unit including a nozzle and a pump means connected thereto and operable from such a source of fluid pressure for spraying liquid solvent upon an associated windshield in the path of the wiper; and coordinating means operable in response to the fluid pressure from such a source to actuate the control and the pump to initiate a liquid spray prior to wiper operation.

2. A windshield cleaning system comprising a cleaner unit including a wiper, a motor to drive the same, and a control for the latter; a washer unit including a nozzle and pump means connected thereto for spraying liquid solvent upon an associated windshield in the path of the wiper, said pump means including a pump chamber with displacing means normally maintaining the chamber filled with liquid solvent; and means for admitting fluid pressure to said control and said pump means to impart liquid displacing movement to said displacing means during the actuation of said control to later start the wiper in operation after the spraying has begun.

3. In a motor vehicle having a super-atmospheric pressure operated windshield wiper motor, a windshield cleaning arrangement comprising in combination a control assembly for controlling operation of the wiper motor, a coupler assembly which is operable by pressure fluid for control of wiper motor operation to the exclusion of the control assembly, and a reservoir assembly including a container for cleaning liquid, a pump assembly which is operable by pressure fluid to discharge cleaning liquid from the container for spraying the vehicle windshield, and a coordinator unit adapted to regulate flow of pressure fluid to the coupler assembly and to the pump assembly in a predetermined sequence and for a predetermined time.

4. In a motor vehicle having a compressed air operated windshield wiper motor, a windshield cleaning arrangement comprising in combination a control assembly for controlling operation of the wiper motor, a coupler assembly which is operable by compressed air for control of wiper motor operation to the exclusion of the control assembly, and a reservoir assembly including a container for cleaning liquid, a pump assembly having a housing portion, said pump assembly operable by pressure fluid to discharge cleaning liquid in the housing portion for spraying the vehicle windshield and having resilient means operable for charging the housing portion with cleaning liquid at atmospheric pressure, and a coordinator unit adapted to regulate flow of compressed air to the coupler assembly and to the pump assembly in a predetermined sequence and for a predetermined time.

5. In a motor vehicle having a compressed air operated windshield wiper motor, a windshield cleaning arrangement comprising in combination, a control assembly for controlling operation of the wiper motor, a coupler assembly operable by compressed air for control of wiper motor operation to the exclusion of the control assembly, a pump assembly operable for delivery of cleaning liquid to the vehicle windshield, and a coordinator unit operable to regulate flow of compressed air to the coupler assembly and to the pump assembly, said coordinator unit having a first movable means responsive to unbalanced pressure conditions resulting in flow of compressed air to the coupler assembly and to the pump assembly, and also including a second movable means responsive to hydraulic pressure to maintain said first movable means in position to continue allowance of compressed air flow.

6. In a motor vehicle having a compressed air operated windshield wiper motor, a windshield cleaning arrangement comprising in combination, a control assembly for controlling operation of the wiper motor, a coupler assembly operable by compressed air for control of wiper motor operation to the exclusion of the control assembly, a pump assembly operable for delivery of cleaning liquid to the vehicle windshield, and a coordinator unit operable to regulate flow of compressed air to the coupler assembly and to the pump assembly, said coordinator unit having a first movable means responsive to unbalanced pressure conditions resulting in flow of compressed air to the coupler assembly and to the pump assembly, and also including a second movable means responsive to hydraulic pressure to maintain said first movable means in position to continue allowance of compressed air flow, said control assembly having means operable for the establishment of unbalanced pressure conditions in the coordinator unit.

7. In a motor vehicle having a compressed air operated windshield wiper motor, a windshield cleaning arrangement including a reservoir assembly comprising: a container for cleaning liquid; a pump assembly having a housing portion, a flexible diaphragm arranged in the housing portion for dividing the same into a top volume and a bottom volume, and a resilient means in the bottom volume in compressive abutment with the diaphragm; a first nipple means having a passageway opening into the top volume; a second nipple means having a passageway opening into the bottom volume; a third nipple means having a passageway opening into the bottom volume; a check valve adapted to allow one-way flow of liquid from the passageway of the third nipple means into the bottom volume; and a coordinator unit arranged to regulate flow of compressed air into the top volume of said housing portion via said first nipple means and for directing flow of liquid coming out of said housing portion via said second nipple means.

8. A coordinator unit for use in a vehicle windshield cleaning system comprising housing portions defining a first chamber and a second chamber, a flexible diaphragm arranged in each chamber for dividing each into a top volume and a bottom volume, said portions being further arranged to provide a passageway interconnecting the bottom volume of the first chamber with the top volume of the second chamber, a spring seat on top of the diaphragm in the first chamber, resilient means in the first chamber compressively arranged between the spring seat and the top of the chamber, a shaft seat arranged on top of the diaphragm in the second chamber, a shaft of smaller diameter than said passageway and extending through said passageway and being affixed at the upper end to the spring seat and at the lower end to the shaft seat, conical valves surrounding said shaft and adapted for alternately seating in opposite ends of said passageway upon end of movement of said shaft in opposite directions, nipple means having a passageway opening into the top volume of the first chamber, nipple means having a passageway opening into the bottom volume of the first chamber, nipple means having a passageway intersecting the passageway connecting the first and second chambers, means venting the top volume of the second chamber to atmosphere, a valve means arranged for flow of liquid into the bottom volume of the second chamber, and a needle valve adapted for the regulated flow of liquid out of the bottom volume of the second chamber.

9. A coordinator unit for use in a vehicle windshield cleaning system comprising housing portions defining a first chamber and a second chamber, a flexible diaphragm arranged in each chamber for dividing each into a top volume and a bottom volume, said portions being further arranged to provide a first passageway interconnecting the bottom volume of the first chamber with the top volume of the second chamber, a spring seat on top of the diaphragm in the first chamber, resilient means in the first chamber compressively arranged between the spring seat and the top of the chamber, means defining a second passageway connecting the top volume to the bottom volume in the first chamber, a shaft seat arranged on top of the diaphragm in the second chamber, a shaft of smaller diameter than the first passageway and extending through said passageway and being affixed at the upper end to the spring seat and at the lower end to the shaft seat, conical valves surrounding said shaft and adapted for alternately seating in opposite ends of the first passageway upon end of movement of said shaft in opposite directions, nipple means having a passageway opening into the top volume of the first chamber, nipple means having a passageway opening into the bottom volume of the first chamber, nipple means having a passageway intersecting the passageway connecting the first and second chambers, means venting the top volume of the second chamber to atmosphere, a valve means arranged for flow of liquid into the bottom volume of the second chamber, and a needle valve adapted for the regulated flow of liquid out of the bottom volume of the second chamber.

10. A coordinator unit for use in a vehicle windshield cleaning system comprising housing portions defining a first chamber and a second chamber, a flexible diaphragm arranged in each chamber for dividing each into a top volume and a bottom volume, said portions being further arranged to provide a first passageway interconnecting the bottom volume of the first chamber with the top volume of the second chamber, a spring seat on top of the diaphragm in the first chamber, resilient means in the first chamber compressively arranged between the spring seat and the top of the chamber, means defining a second passageway connecting the top volume to the bottom volume in the first chamber, a shaft seat arranged on top of the diaphragm in the second chamber, a shaft of smaller diameter than the first passageway and extending through said passageway and being affixed at the upper end to the spring seat and at the lower end to the shaft seat, conical valves surrounding said shaft and adapted for alternately seating in opposite ends of the first passageway upon end of movement of said shaft in opposite directions, nipple means having a passageway opening into the top volume of the first chamber, nipple means having a passageway opening into the bottom volume of the first chamber, nipple means having a passageway intersecting the passageway connecting the first and second chambers, means venting the top volume of the second chamber to atmosphere, housing means defining a third chamber, a first nipple means having a passageway leading into said third chamber, a second nipple means having a passageway leading into said third chamber, a valve positioned for the one-way flow of liquid from the passageway of the second nipple means into the third chamber, a valve means arranged for flow of liquid from the passageway of the second nipple means into the bottom volume of the second chamber, and a needle valve adapted for the regulated flow of liquid out of the bottom volume of the second chamber into the passageway of the second nipple means.

References Cited in the file of this patent
UNITED STATES PATENTS
2,743,473   Oishei _____ May 1, 1956